(12) United States Patent
Chen et al.

(10) Patent No.: US 11,611,697 B2
(45) Date of Patent: Mar. 21, 2023

(54) OPTICAL IMAGE STABILIZATION MOVEMENT TO CREATE A SUPER-RESOLUTION IMAGE OF A SCENE

(71) Applicant: Google LLC, Mountain View, CA (US)

(72) Inventors: Yi Hung Chen, Taipei (TW); Chia-Kai Liang, San Jose, CA (US); Bartlomiej Maciej Wronski, San Francisco, CA (US); Peyman Milanfar, Menlo Park, CA (US); Ignacio Garcia Dorado, Mountain View, CA (US)

(73) Assignee: Google LLC, Mountain View, CA (US)

( * ) Notice: Subject to any disclaimer, the term of this patent is extended or adjusted under 35 U.S.C. 154(b) by 41 days.

(21) Appl. No.: 17/263,743

(22) PCT Filed: Aug. 6, 2019

(86) PCT No.: PCT/US2019/045334
§ 371 (c)(1),
(2) Date: Jan. 27, 2021

(87) PCT Pub. No.: WO2020/033427
PCT Pub. Date: Feb. 13, 2020

(65) Prior Publication Data
US 2021/0374909 A1     Dec. 2, 2021

Related U.S. Application Data

(60) Provisional application No. 62/716,346, filed on Aug. 8, 2018.

(51) Int. Cl.
*H04N 5/232*     (2006.01)

(52) U.S. Cl.
CPC ....... *H04N 5/23232* (2013.01); *H04N 5/2328* (2013.01); *H04N 5/23254* (2013.01); *H04N 5/23258* (2013.01)

(58) Field of Classification Search
None
See application file for complete search history.

(56) References Cited

U.S. PATENT DOCUMENTS

| 7,941,004 | B2 | 5/2011 | Zhu et al. |
| 8,306,121 | B2 * | 11/2012 | Jia .......................... G06T 3/4053 |
| | | | 375/240.16 |

(Continued)

FOREIGN PATENT DOCUMENTS

| CN | 106357957 | 1/2017 |
| CN | 107040708 | 8/2017 |

(Continued)

OTHER PUBLICATIONS

"International Search Report and Written Opinion", PCT Application No. PCT/US2019/045342, dated Oct. 16, 2019, 20 pages.

(Continued)

*Primary Examiner* — Cynthia Segura
(74) *Attorney, Agent, or Firm* — Colby Nipper PLLC (57) ABSTRACT

The present disclosure describes systems and techniques directed to optical image stabilization movement to create a super-resolution image of a scene. The systems and techniques include a user device (102) introducing (502), through an optical image stabilization system (114), movement to one or more components of a camera system (112) of the user device (102). The user device (102) then captures (504) respective and multiple frames (306) of an image of a scene, where the respective and multiple frames (306) of the image of the scene have respective, sub-pixel offsets of the image of the scene across the multiple frames (306) as a result of the introduced movement to the one or more components of the camera system (112). The user device (102) performs (506), based on the respective, sub-pixel offsets of the image of the scene across the respective, multiple frames (306), super-resolution computations and (Continued)

creates (508) the super-resolution image of the scene based on the super-resolution computations.

20 Claims, 5 Drawing Sheets

(56) References Cited

U.S. PATENT DOCUMENTS

| | | | |
|---|---|---|---|
| 8,587,696 B2 | 11/2013 | Georgis et al. | |
| 8,594,464 B2* | 11/2013 | Liu | H04N 7/0117 |
| | | | 382/294 |
| 9,124,797 B2* | 9/2015 | Guenter | H04N 5/35721 |
| 9,262,813 B2* | 2/2016 | Kotani | H04N 5/2353 |
| 9,288,395 B2* | 3/2016 | Baer | H04N 5/23287 |
| 9,426,362 B2 | 8/2016 | Tang et al. | |
| 2006/0139473 A1* | 6/2006 | Shin | H04N 1/00307 |
| | | | 348/333.09 |
| 2011/0102606 A1* | 5/2011 | Toyomura | H04N 7/185 |
| | | | 348/340 |
| 2012/0069238 A1* | 3/2012 | Toyomura | H04N 5/23232 |
| | | | 348/340 |
| 2014/0125825 A1 | 5/2014 | Baer et al. | |
| 2014/0375865 A1* | 12/2014 | Shroff | H04N 5/23216 |
| | | | 348/333.12 |
| 2015/0169990 A1 | 6/2015 | Mclaughlin | |
| 2016/0212332 A1* | 7/2016 | Tang | H04N 5/349 |
| 2017/0171456 A1* | 6/2017 | Wei | H04N 13/296 |
| 2017/0272655 A1* | 9/2017 | Sakurai | H04N 5/23209 |
| 2021/0266519 A1* | 8/2021 | Jang | H04N 13/271 |
| 2021/0304359 A1 | 9/2021 | Chen et al. | |

FOREIGN PATENT DOCUMENTS

| | | |
|---|---|---|
| JP | 2007057998 | 3/2007 |
| JP | 2016152602 | 8/2016 |
| KR | 20060075381 | 7/2006 |
| KR | 20120008062 | 1/2012 |
| KR | 20150014495 | 2/2015 |
| KR | 20180008588 | 1/2018 |
| WO | 2020033427 | 2/2020 |
| WO | 2020033432 | 2/2020 |

OTHER PUBLICATIONS

"International Search Report and Written Opinion", PCT Application No. PCT/US2019/045334, dated Oct. 23, 2019, 17 pages.
Ben-Ezra, et al., "Jitter Camera: High Resolution Video from a Low Resolution Detector", 2018 IEEE/CVF Conference on Computer Vision and Pattern Recognition Workshops, 2018, 17 pages.
Guo, et al., "Super-Resolution Reconstruction of Astronomical Images Using Time-Scale Adaptive Normalized Convolution", Chinese Society of Aeronautics and Astronautics & Beihang University, Jun. 21, 2018, 12 pages.
Karch, et al., "Robust Super-Resolution by Fusion of Interpolated Frames for Color and Grayscale Images", Frontiers in Physics, Apr. 24, 2015, 14 pages.
Li, et al., "Jittered Exposures for Image Super-Resolution", 2018 IEEE/CVF Conference on Computer Vision and Pattern Recognition Workshops, 2018, 8 pages.
Nasrollahi, et al., "Super-Resolution: A Comprehensive Survey", Machine Vision and Applications (2014) 25:1423-1468, Jun. 14, 2014, 46 pages.
Wronski, et al., "Handheld Multi-Frame Super-Resolution", ACM Transactions on Graphics, vol. 38, No. 4, Jul. 12, 2019, Jul. 12, 2019, 18 pages.
"Foreign Office Action", CN Application No. 201980045299.3, dated Aug. 25, 2021, 15 pages.
"Foreign Office Action", IN Application No. 202147005282, dated Jan. 11, 2022, 6 pages.
"Foreign Office Action", IN Application No. 202147005283, dated Jan. 12, 2022, 10 pages.
"Foreign Office Action", KR Application No. 10-2021-7003928, dated Feb. 21, 2022, 13 pages.
"International Preliminary Report on Patentability", Application No. PCT/US2019/045334, dated Feb. 9, 2021, 10 pages.
"International Preliminary Report on Patentability", Application No. PCT/US2019/045342, dated Feb. 9, 2021, 13 pages.
"Foreign Office Action", JP Application No. 2021-506479, dated May 10, 2022, 12 pages.
"Foreign Office Action", JP Application No. 2021-506477, dated May 10, 2022, 8 pages.
"Foreign Office Action", KR Application No. 10-2021-7003929, dated Jun. 29, 2022, 12 pages.
"Foreign Office Action", JP Application No. 2021-506479, dated Sep. 13, 2022, 11 pages.
Park, et al., "Super-Resolution Image Reconstruction", May 2003, 16 pages.
"Foreign Notice of Allowance", KR Application No. 10-2022-7041057, dated Dec. 9, 2022, 5 pages.

* cited by examiner

```
┌─────────────────────────────────────┐
│ Introduce, through an optical image │
│ stabilization system, movement to   │
│ one or more components of a camera  │
│ system                              │
│ 502                                 │
└─────────────────────────────────────┘
                  │
                  ▼
┌─────────────────────────────────────┐
│ Capture respective and multiple     │
│ frame of an image of a scene, the   │
│ respective and multiple frames of   │
│ the image of the scene having       │
│ respective, sub-pixel offsets of    │
│ the image of the scene across the   │
│ multiple frames as a result of the  │
│ introduced movement to the one or   │
│ more components of the camera       │
│ system                              │
│ 504                                 │
└─────────────────────────────────────┘
                  │
                  ▼
┌─────────────────────────────────────┐
│ Perform super-resolution            │
│ computations based on the           │
│ respective, sub-pixel offsets       │
│ 506                                 │
└─────────────────────────────────────┘
                  │
                  ▼
┌─────────────────────────────────────┐
│ Create a super-resolution image of  │
│ the scene based on the              │
│ super-resolution computations       │
│ 508                                 │
└─────────────────────────────────────┘
```

Fig. 5

OPTICAL IMAGE STABILIZATION MOVEMENT TO CREATE A SUPER-RESOLUTION IMAGE OF A SCENE

BACKGROUND

Camera technology associated with a user device today, such as a digital lens single-reflex (DLSR) camera or a smartphone having an image sensor, has advanced on several fronts. As one example, the user device may include an Optical Image Stabilization (OIS) camera module that combines a camera system having the image sensor with an OIS system to compensate for motion of the user device while the user device is capturing images. As another example, the user device may include super-resolution capabilities that create a super-resolution image from multiple, low-resolution images of a scene, wherein the multiple, low-resolution images of the scene are multiple images captured using native resolution capabilities of the camera system and the super-resolution image is of a resolution that is higher than the native resolution capabilities of the camera system.

In some instances, use of the OIS system is incompatible with, or in conflict with, the super-resolution capabilities of the user device. For example, if the multiple, low-resolution images of a scene need to reflect position offsets (or differences in pixel positions) of the images of the scene for super-resolution algorithms to function, stability introduced by the OIS system during the capture of the multiple, low-resolution images of the scene may prevent the needed position offsets. As another example, if the user device is in a stable state with no movement (and the OIS system is not functioning or compensating for motion during the capture of the multiple-low resolution images), the multiple low-resolution images may be identical and not possess the needed position offsets.

Furthermore, the user device may capture the multiple images of the scene in a variety of modes, including a burst sequence mode that occurs before and after the press of a shutter button, as well as during a zero shutter-lag mode that occurs nearly simultaneously with the press of the shutter button. The aforementioned incompatibilities between the OIS system and the super-resolution capabilities of the user device compound themselves further in such instances.

SUMMARY

The present disclosure describes systems and techniques directed to optical image stabilization movement to create a super-resolution image of a scene. The systems and techniques include a user device using an optical image stabilization system to introduce movement to one or more components of a camera system of the user device. The user device then captures respective and multiple frames of an image of a scene, where the respective and multiple frames of the image of the scene have respective, sub-pixel offsets of the image of the scene across the multiple frames as a result of the introduced movement to the one or more components of the camera system. The user device performs, based on the respective, sub-pixel offsets of the image of the scene across the respective, multiple frames, super-resolution computations and creates the super-resolution image of the scene based on the super-resolution computations.

The system and techniques can therefore create super-resolution images without affecting Optical Image Stabilization (OIS) system performance. Furthermore, the systems and techniques can stabilize the one or more components of the camera system without distracting the user, work with "zero shutter-lag" modes, and don't require waiting for a user to press the shutter movement, minimizing input lag and latencies that may be detrimental to obtaining high-quality images and to the user's experience.

In some aspects, a method used to create a super-resolution image of a scene is described. The method includes a user device introducing movement to one or more components of a camera system of the user device. As part of the method, the user device captures respective and multiple frames of an image of a scene, where the respective and multiple frames of the image of the scene have respective, sub-pixel offsets of the image of the scene across the multiple frames as a result of the introduced movement to the one or more components of the camera system. The method continues, where, based on the respective, sub-pixel offsets of the image of the scene across the respective, multiple frames, the user device performs super-resolution computations and creates the super-resolution image of the scene based on the super-resolution computations.

In yet other aspects, a user device is described. The user device includes a camera system that has image sensors and an OIS system, processors, and a display. The user device also includes a computer-readable storage media storing instructions of an optical image-stabilization system drive manager application and a super-resolution manager application that, when executed by the processors, perform complementary functions that direct the user device to perform a series of operations.

The series of operations includes receiving, by the one or more processors, a command that directs the user device to capture an image of a scene. The series of operations also includes introducing movement to one or more components of the camera system during the capture of the image of the scene, wherein the introduced movement results in the capture of respective and multiple frames of the image of the scene that have respective, sub-pixel offsets of the image across the multiple frames and performing, by the one or more processors and based on the respective, sub-pixel offsets of the image of the scene across the multiple frames, super-resolution computations. The series of operations further includes creating, by the one or more processors based on the super-resolution computations, a super-resolution image of the scene and rendering, by the display, the super-resolution image of the scene.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This present disclosure describes details of one or more aspects associated with optical image stabilization movement to create a super-resolution image of a scene.

DETAILED DESCRIPTION

The present disclosure describes systems and techniques directed to optical image stabilization movement to create a super-resolution image of a scene.

While features and concepts of the described systems and techniques for optical image stabilization movement to create a super-resolution image of a scene can be implemented in any number of different environments, systems, devices, and/or various configurations, aspects are described in the context of the following example devices, systems, and configurations.

Example Operating Environment

Figure 1:
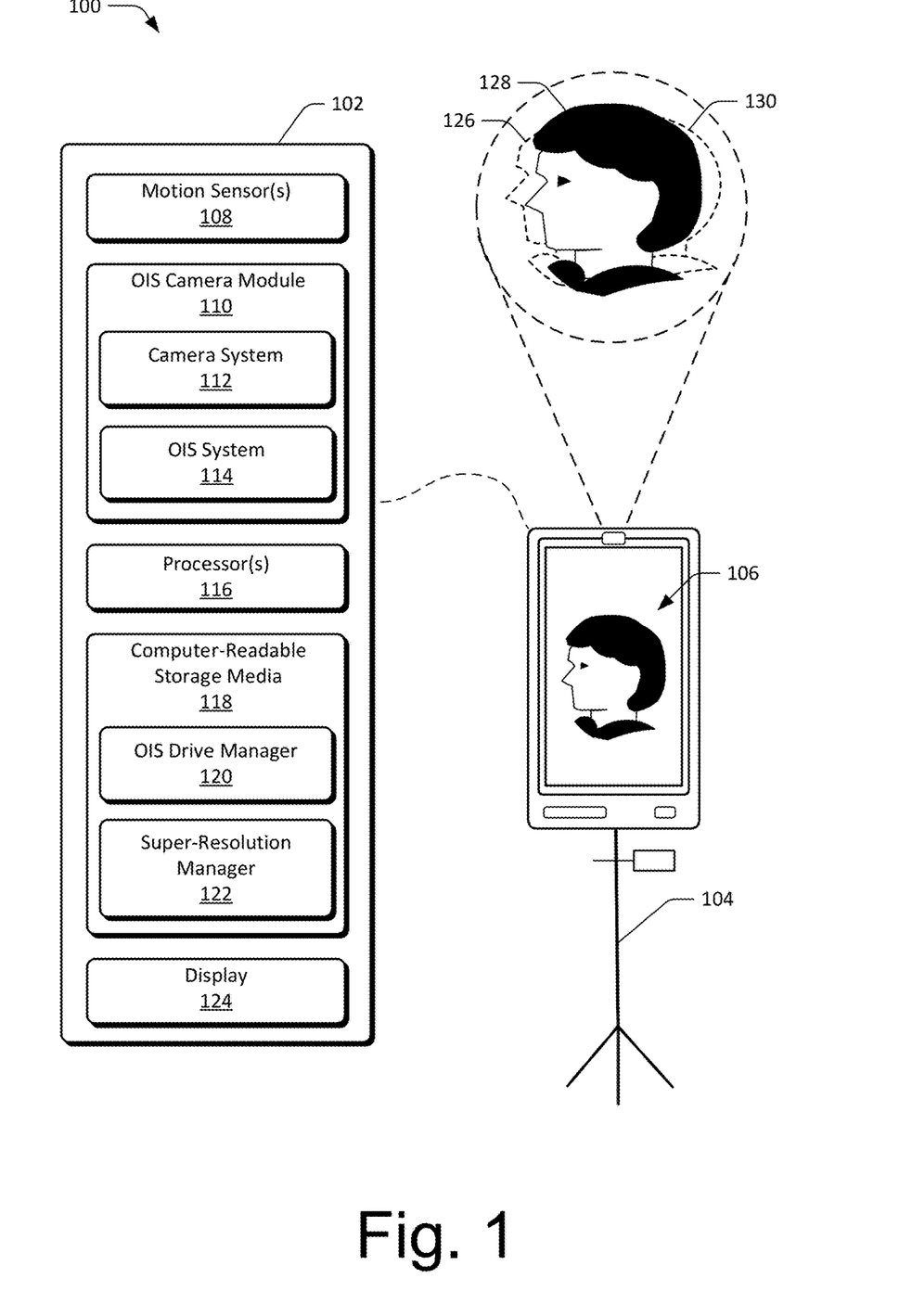
FIG. 1 illustrates an example operating environment in which various aspects of optical image stabilization movement to create a super-resolution image scene are performed.

FIG. 1 illustrates an example operating environment 100 in which various aspects of optical image stabilization movement to create a super-resolution image of a scene are performed. As illustrated, a user device 102 is fixed to a tripod 104 and rendering a super-resolution image 106 of a scene that it is capturing. Although illustrated as a smartphone, the user device 102 may be another type of device that has image-capture capabilities, such as a DLSR camera or a tablet. The fixing of the user device 102 to the tripod 104 constrains the user device 102 such that the user device 102 is stationary with no motion.

The user device 102 includes a combination of one or more motion sensor(s) 108 (e.g., a gyroscope, an accelerometer) that detect a motion condition of the user device 102. In some instances, such as when the user device 102 is fixed to the tripod 104, the detected motion condition may be a static motion condition (i.e., the user device 102 not moving). In other instances, such as when the user device 102 is removed from the tripod 104, the detected motion condition may be a dynamic motion condition (i.e., any motion condition that is not a static motion condition).

The user device also includes an Optical Image Stabilization (OIS) camera module 110, which includes a camera system 112 and an OIS system 114. The camera system 112 may include multiple components such as a lens, an aperture, and one or more image sensors (e.g., 40 megapixel (MP), 32 MP, 16 MP, 8 MP). The image sensor(s) may include a complementary metal-oxide semiconductor (CMOS) image sensor or a charge-coupled device (CCD) image sensor. In some instances, the image sensor(s) may include a color filter array (CFA) that overlays pixels of the image sensor and limits intensities, as associated with color wavelengths, of light recorded through the pixels. An example of such a CFA is a Bayer CFA, which filters light according to a red wavelength, a blue wavelength, and a green wavelength.

The OIS system 114, in general, provides mechanics to modify physical positions or orientations of one or more components of the camera system 112. The OIS system 114 may include micro-scale motors and magnetic-induction positioning mechanisms that can change an in-plane position, an out-of-plane position, a pitch, a yaw, or a tilt of one or more components of the camera system 112. The in-plane position may be a position that lies within a plane defined by two axes, while the out-of-plane position may be another position that lies outside the plane defined by the two axes.

The user device 102 also includes a combination of one or more processor(s) 116. The processor 116 may be a single core processor or a multiple core processor composed of a variety of materials, such as silicon, polysilicon, high-K dielectric, copper, and so on. In an instance of multiples of the processor 116 (e.g., a combination of more than one processor), the multiples of processor 116 may include a central processing unit (CPU), a graphics processing unit (GPU), a digital signal processor (DSP), or an image processing unit (IPU). Furthermore, and in such an instance, the multiples of the processor 116 may perform two or more computing operations using pipeline-processing.

The user device 102 also includes computer-readable storage media (CRM) 118 that includes executable instructions in the form of an OIS drive manager 120 and a super-resolution manager 122. The CRM 118 described herein excludes propagating signals. The CRM 118 may include any suitable memory or storage device such as random-access memory (RAM), static RAM (SRAM), dynamic RAM (DRAM), non-volatile RAM (NVRAM), read-only memory (ROM), or Flash memory useable to store the OIS drive manager 120 and the super-resolution manager 122.

In some instances, the OIS drive manager 120 and the super-resolution manager 122 may be executed by the processor 116 to cause the user device 102 to perform complementary functions that are effective to produce OIS movement (e.g., a physical movement or change to positions of one or more elements of the camera system 112), capture multiple frames of an image of a scene with sub-pixel offsets, and compute the super-resolution image (106) of a scene. In some instances, the OIS movement may correspond to changes in position to the camera system 112 that would manifest through a natural, handheld motion of a user operating the user device (e.g., a hand tremor or other natural biomechanics of the user).

The code or instructions of the OIS drive manager 120 may be executed, using the processor 116, to direct the OIS system 114 to perform the OIS movement. In some instances, the OIS movement may be an unsynchronized movement (e.g., movement within a predetermined range of positional displacements and having no temporal synchronization). Such an unsynchronized movement can be applicable to a static motion condition.

In other instances, the OIS movement may be a synchronized movement (e.g., movement corresponding to a range of positional displacements that are dependent upon, and temporally synchronized with, detected motions of the user device 102). Such a synchronized movement can be applicable to a dynamic motion condition and superimposed onto another OIS movement introduced to the OIS system 114.

The code or instructions of the super-resolution manager 122, when executed by the processor 116, may direct the user device 102 to perform multiple operations that are complementary to the operations performed under the direction of the OIS drive manager 120. Such operations may include directing the camera system 112 to capture, in a burst sequence, multiple frames of an image of a scene, perform super-resolution computations, and render, using a display 124 of the user device, the super-resolution image 106 of the scene.

Due to the OIS movement (e.g., the movement introduced to the camera system 112 by the OIS system 114 under the direction of the OIS drive manager 120), the camera system 112 may capture multiple variations 126, 128, and 130 of the image of the scene, where the multiple variations 126-130 correspond to multiple frames of the image of the scene that have respective, sub-pixel offsets of the image across the multiple frames.

During the OIS movement, the OIS drive manager 120 may compute coverage scores, either analytically or numerically through uniform sampling of the multiple frames of the image of the scene. The computed coverage scores may, in some instances, cause additional or supplemental OIS movements to define image content of the captured, multiple variations 126-130. This movement may ensure full coverage of the image of the scene and produce a higher quality image.

The super-resolution computations may include, for example, Gaussian radial basis function (RBF) computations combined with robustness model computations to create the super-resolution image 106 of the scene. The super-resolution computations use the variations 126-130 of the image of the scene (e.g., the multiple frames of the image of the scene that have respective, sub-pixel offsets of the image across the multiple frames) to create the super-resolution image 106 of the scene.

Figure 2:
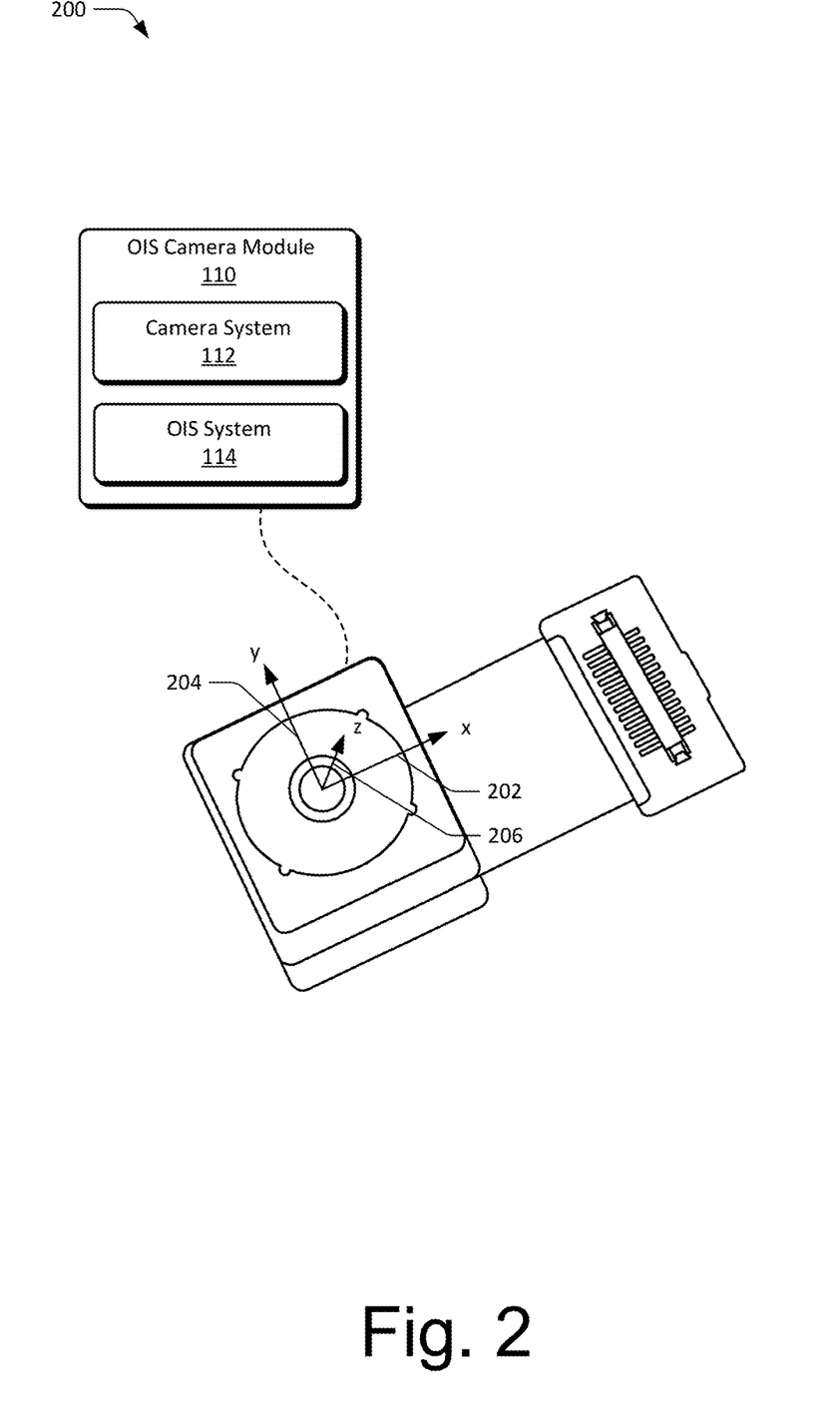
FIG. 2 illustrates example aspects of movement introduced by an OIS system.

FIG. 2 illustrates example aspects 200 of movement introduced by an OIS system. Aspects 200 include the camera system 112 and the OIS system 114 of the user device 102 of FIG. 1.

As illustrated, the OIS system 114 may introduce movement to the camera system 112. An "in-plane" movement may be a movement contained within a plane defined by the x-axis 202 and the y-axis 204. The plane defined by the x-axis 202 and the y-axis 204, corresponds to (e.g., is parallel to) another plane having the super-resolution image 106 of the scene. An "out-of-plane" movement may be a movement that is outside the plane defined by the x-axis 202 and the y-axis 204 and may be a movement along the z-axis 206 or another movement that includes a pitch, yaw, or roll.

The movement introduced by the OIS system 114 may be triggered by one or more factors. For example, the movement introduced to the OIS system 114 may in response to the user device 102 entering a viewfinder mode, in response to the user device 102 receiving a capture command, or in response to the user device 102 detecting a motion condition through the motion sensors 108. The movement introduced by the OIS system 114 may also be triggered through a combination of one or more of such factors.

Figure 3:
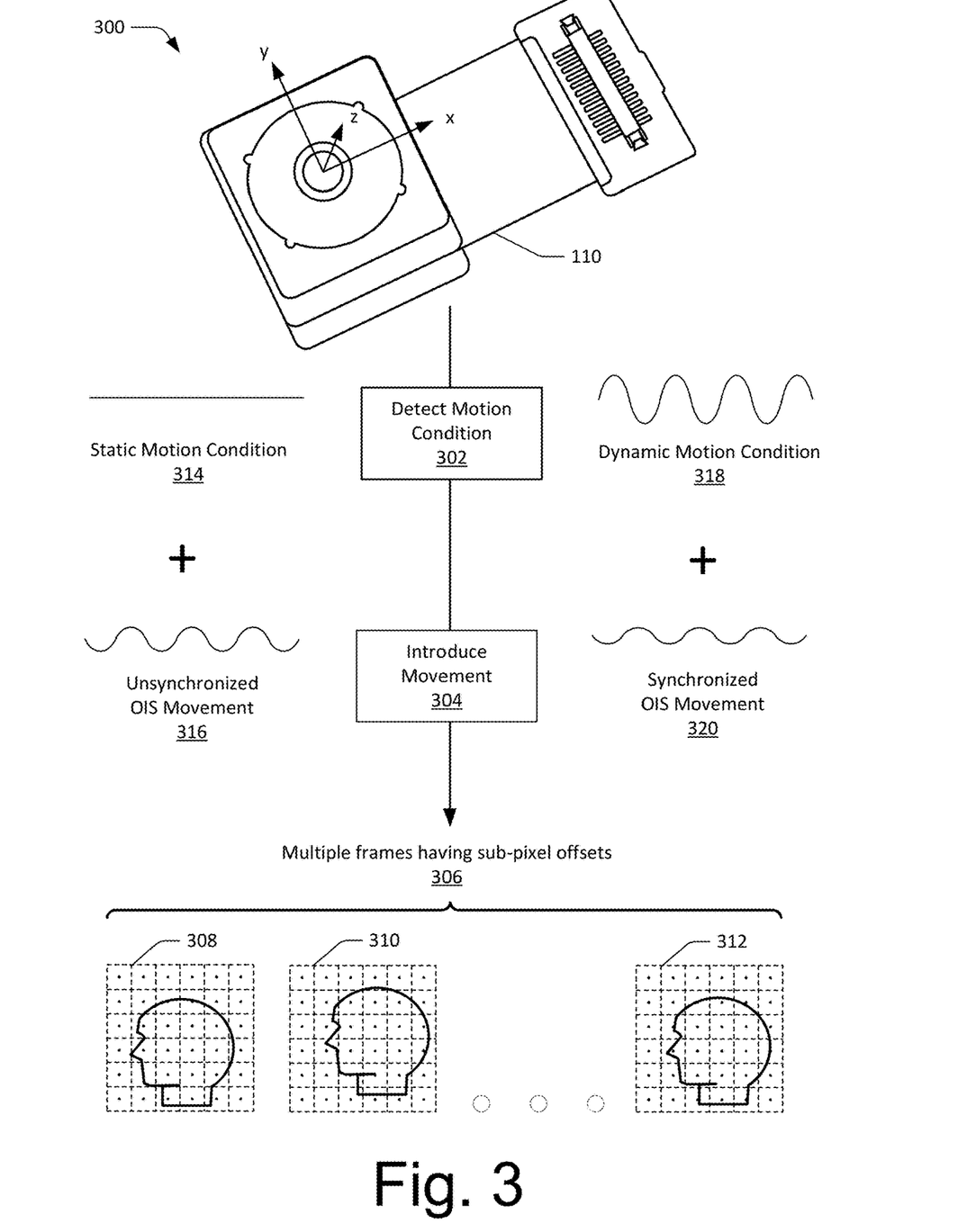
FIG. 3 illustrates example aspects associated with detecting a motion condition and introducing movement to an OIS system.

FIG. 3 illustrates example aspects 300 associated with detecting a motion condition and introducing movement to an OIS system. The example aspects 300 may be performed by the user device 102 of FIG. 1 and the OIS camera module 110 of FIG. 2. The OIS drive manager 120 (being executed by the processor 116) may introduce movement to camera system 112 through the OIS system 114. In some instances, the movement introduced to the camera system 112 through the OIS system 114 may simply stabilize the camera system 112 during the capture of an image of a scene, while in other instances the movement introduced to the camera system 112 through the OIS system 114 may introduce sub-pixel offsets to multiple images of a scene during the capture of the multiple images of the scene. In yet other instances, the movement introduced to the camera system 112 through the OIS system 114 may be a combination of movements that stabilize capture of some frames of the image the scene (e.g., no sub-pixel offsets for clarity purposes) and also introduce offsets during capturing of other frames of the image of the scene (e.g., preserve sub-pixel offsets for super-resolution purposes).

The example aspects 300 include detection of a motion condition 302, an introduction of movement 304, and a capturing of multiple frames 306 having sub-pixel offsets (frames 308-312 correspond to variations 126-128 of FIG. 1) The multiple frames 306 serve as a basis for computing and forming the super-resolution image 106. The user device 102 may capture the multiple frames 306, using a resolution that is lower than another resolution of the super-resolution image 106 of the scene, during a burst sequence.

Detection of the motion condition 302 may include detecting a static motion condition 314 or a dynamic motion condition 318. Introduction of the movement 304 to the camera system 112 may include the OIS drive manager 120 introducing, during the burst sequence, an unsynchronized OIS movement 316 or a synchronized OIS movement 320.

In the instance of the synchronized OIS movement 320, the OIS system 114 may introduce a first movement that is intended to stabilize the camera system 112 from the detected dynamic motion condition 318 (e.g., stabilize the camera system 112 to capture frames of an image of a scene with clarity and without sub-pixel offsets). The synchronized movement 320 may be a second movement that is synchronized with, and superimposed onto, the first movement (e.g., a movement that is opposite movement associated with the detected dynamic motion condition 318) with the intent of generating or preserving sub-pixel offsets across the frames of the image of the scene. Depending on the magnitude of the first movement, the superimposing of the second movement may be constructive or destructive in nature (e.g., "add to" or "subtract from" the first movement). Furthermore, some portions of the second movement may be greater than a pixel while other portions of the second movement may be less than a pixel.

The burst sequence may include capturing the multiple frames 306 at a set time interval that may range, for example, from one millisecond to three milliseconds, one millisecond to five milliseconds, or one-half millisecond to ten milliseconds. Furthermore, and in some instances, the time interval of the burst sequence may be variable based on a motion of the user device (e.g., a time interval may be "shorter" during a high-velocity motion of the user device 102 than another time interval during a low-velocity motion of the user device 102 to keep offsets at less than one pixel).

The introduction of the movement 304 during the burst sequence effectuates the user device 102 capturing the multiple frames 306 such that the multiple frames 306 have respective, relative sub-pixel offsets. As illustrated the image of frame 310 is respectively offset, relative to the image of frame 308, one half-pixel horizontally and one half-pixel vertically. Furthermore, and as illustrated, the image of frame 312 is respectively offset, relative to the image of frame 308, one-quarter pixel horizontally. Respective, relative sub-pixel offsets can include different magnitudes and combinations of sub-pixel offsets (e.g., one sub-pixel offset associated with one frame might be one-quarter pixel horizontally and three-quarters of a pixel vertically, while another sub-pixel offset that is associated with another frame might be zero pixels horizontally and one-half of a pixel vertically). In general, the techniques and systems described by this present disclosure can accommodate sub-pixel offsets that are more random than the illustrations and descriptions of frames 308-312, including sub-pixel offsets that are non-uniform.

Figure 4:
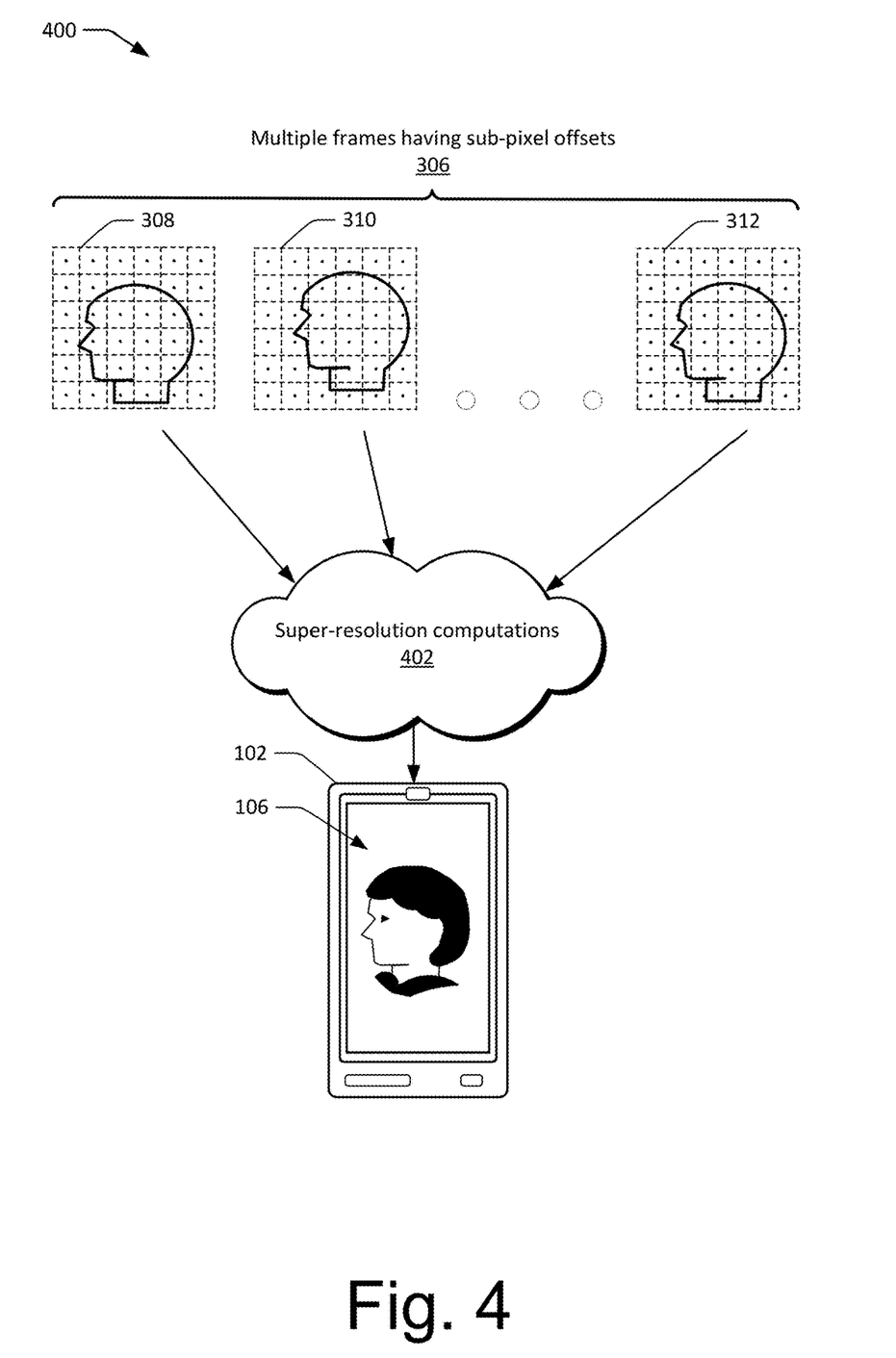
FIG. 4 illustrates example aspects of using multiple frames having sub-pixel offsets to perform super-resolution computations and create a super-resolution image of a scene.

FIG. 4 illustrates example aspects 400 of using multiple frames 306 having sub-pixel offsets, as introduced by OIS movement, to perform super-resolution computations and create a super-resolution image of a scene. The example aspects 400 may use elements of FIGS. 1-3, wherein performing the super-resolution computations are performed by the user device 102 of FIG. 1, the sub-pixel offsets are a result of the OIS movement of FIG. 2, and the multiple frames having the sub-pixel offsets are the multiple frames 306 of FIG. 3.

As illustrated in FIG. 4, the multiple frames 306 are input to super-resolution computations 402 performed by the user device 102. Algorithms that support the super-resolution computations 402 may reside in the super-resolution manager 122 of the user device 102. In some instances, the user device 102 (e.g., multiples of the processor 116) may perform portions of the super-resolution computations 402 using pipeline-processing. In general, the super-resolution computations 402 may use a variety of algorithms and techniques.

A first example of the super-resolution computations 402 includes Gaussian radial basis function (RBF) kernel computations. To perform the Gaussian RBF kernel computations, the user device 102 filters pixel signals from each frame of the multiple frames 306 to generate respective color-specific image planes corresponding to color channels. The user device 102 then aligns the respective color-specific image planes to a selected reference frame.

Continuing with the first example of the super-resolution computations 402, the Gaussian RBF kernel computations can include the user device 102 analyzing local gradient structure tensors to compute a covariance matrix. Computing the covariance matrix may rely on the following mathematical relationship:

$$\Omega = [e_1 \ e_2] \begin{bmatrix} k_1 & 0 \\ 0 & k_2 \end{bmatrix} \quad (1)$$

In mathematical relationship (1), $\Omega$ represents a kernel covariance matrix, $e_1$ and $e_2$ represent orthogonal direction vectors and two associated eigenvalues $\lambda_1$ and $\lambda_2$, and $k_1$ and $k_2$ control a desired kernel variance.

Computing the local gradient structure tensors may rely on the following mathematical relationship:

$$\hat{\Omega} = \begin{bmatrix} I_x^2 & I_x I_y \\ I_x I_y & I_y^2 \end{bmatrix} \quad (2)$$

In mathematical relationship (2), $I_x$ and $I_y$ represent local image gradient in horizontal and vertical directions, respectively.

Also, as part of the first example of the super-resolution computations 402, the user device 102 may compute a robustness model using a statistical neighborhood model that includes color mean and spatial standard deviation computations. The robustness model computations, in some instances, may include denoising computations to compensate for color differences.

The super-resolution image computations 402 are effective to estimate, for each of the multiple frames 306 (e.g., for frame 308, 310, and 312), the contribution of pixels to color channels associated with respective color planes.

Continuing with the first example of the super-resolution computations 402, color planes may be accumulated using the following mathematical relationship for normalization computations:

$$C(x, y) = \frac{\sum_n \sum_i c_{n,i} \cdot w_{n,i} \cdot \hat{R}_n}{\sum_n \sum_i w_{n,i} \cdot \hat{R}_n} \quad (3)$$

In mathematical relationship (3), x and y represent pixel coordinates, the sum $\Sigma_n$ operates over (or is a sum of) contributing frames, the sum $\Sigma_i$ is a sum of samples within a local neighborhood, $c_{n,i}$ represents a value of a Bayer pixel at a given frame n and sample $w_{n,i}$ represents a local sample weight, and $\hat{R}_n$ represents a local robustness. The accumulated color planes may be combined to create the super-resolution image 106 of the scene.

A second example of the super-resolution computations 402 may include analyzing the influence of motion blur. Such super-resolution computations may analyze the influence of motion blur of multiple images (e.g., the multiple frames 306) using a "volume of solutions" computational approach that addresses uncertainties in pixel measurements due to quantization errors.

A third example of the super-resolution computations 402 may include computations that use a frame-recurrent approach. Such an approach may use, iteratively, a previous low-resolution frame, a previously computed high-resolution image, and a current low-resolution frame to create a current super-resolution image (e.g., the previous low-resolution frame and the current low-resolution frame may be frame 308 and frame 310, respectively). The recurrent approach may include flow estimations to estimate a normalized, low-resolution flow map, upscaling the low-resolution flow map with a scaling factor to produce a high-resolution flow map, using the high-resolution flow map to warp a previous high-resolution image, mapping the warped, previous high-resolution image to a low-resolution space, and concatenating mapping of the low-resolution space to the current super-resolution image.

The super-resolution computations 402 of FIG. 4 may also use algorithms and techniques that are other or additional to those described in the previous examples. Such algorithms and techniques may include machine-learned algorithms and techniques. Regardless, and in accordance with the present disclosure, introducing movement to the one or more components of the camera system 112 are applicable to the other algorithms and techniques.

Example Method

Example method 500 is described with reference to FIG. 5 in accordance with one or more aspects associated with optical image stabilization movement to create a super-resolution image of a scene. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Figure 5:
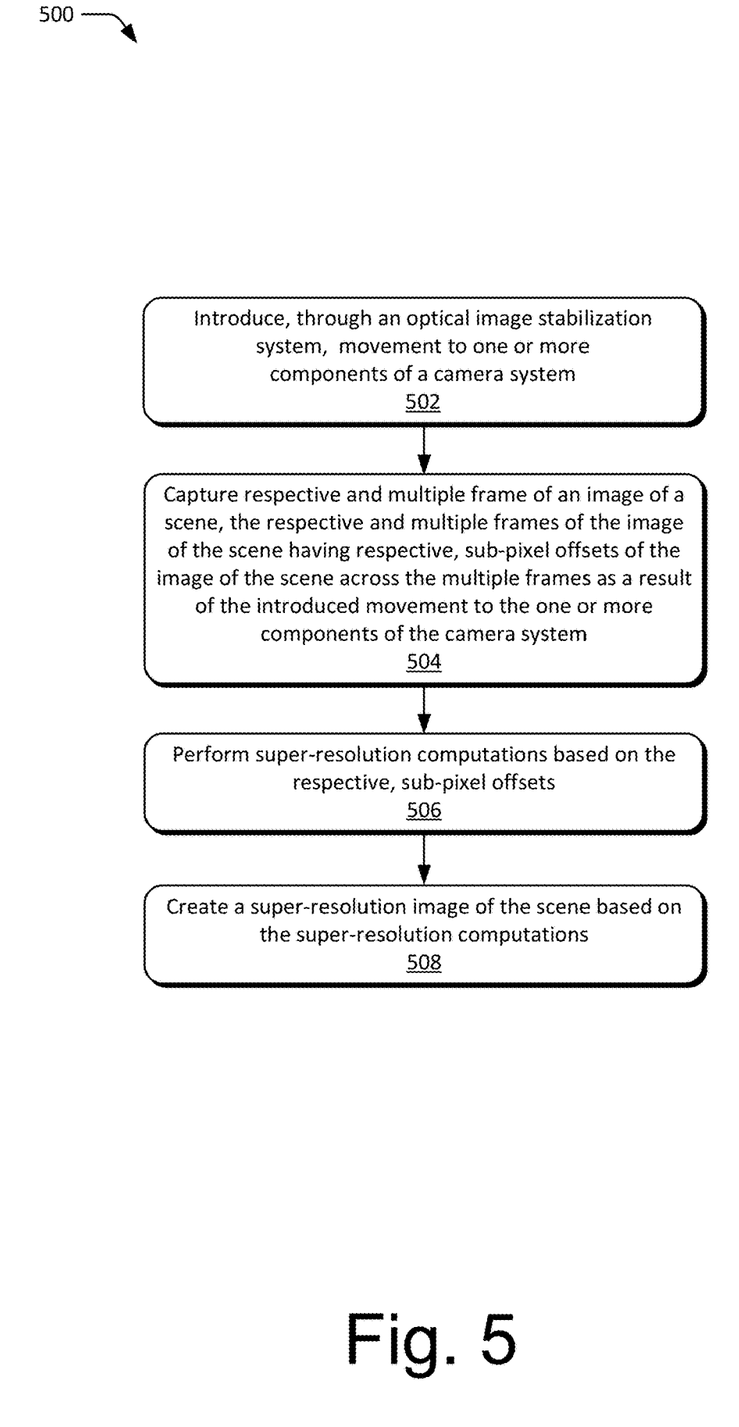
FIG. 5 illustrates an example method used for optical image stabilization movement to create a super-resolution image of a scene.

FIG. 5 illustrates example aspects of a method 500 used as part of creating a super-resolution image of a scene. The method 500 is described in the form of a set of blocks 502-508 that specify operations that can be performed. However, operations are not necessarily limited to the order shown in FIG. 5 or described herein, for the operations may be implemented in alternative orders, in fully or partially overlapping manners, or in iterative fashions. Furthermore, although the operations represented by the method 500 will be described in the context of being performed by the user device 102 of FIG. 1 using elements of FIGS. 2-4, the operations (or portions of the operations) may be performed by one or more other devices having computational capabilities, such as a server or a cloud-computing device including instructions (or portions of instructions) of the super-resolution manager 122.

At block 502, the user device 102 (e.g., processor 116 executing the code of the OIS drive manager 120) introduces movement to one or more components of a camera system 112 (e.g., the OIS system 114 introduces the movement to the camera system 112). In some instances, the user device 102 may introduce the movement in response to entering a viewfinder mode, while in other instances the user device 102 may introduce the movement in response to receiving a capture command Introducing the movement may include introducing an in-plane movement or introducing an out-of-plane movement to the one or more components of the camera system 112.

At block 504, the user device 102 captures respective and multiple frames 306 of an image of a scene that, as a result of the introduced movement to the one or more components of the camera system 112, have respective, sub-pixel offsets of the image of the scene 306 across the multiple frames.

At block 506, the user device 102 (e.g., the processor 116 executing the instructions of the super-resolution manager 122) performs super-resolution computations 402 based on the respective, sub-pixel offsets of the image of the scene across the multiple frames. Examples of super-resolution computations 402 include (i) computing Gaussian radial basis function kernels and computing a robustness model, (ii) analyzing the influence of motion blur across the multiple frames, and (iii) using a frame-recurrent approach that uses, from the multiple frames, a previous low-resolution frame and a current low-resolution frame to create a current super-resolution image.

At block 508, and based on the super-resolution computations 402, the user device 102 (e.g., the processor 116 executing the instructions of the super-resolution manager 122) creates the super-resolution image 106 of the scene.

The example method 500 may also include altering the movement based on a coverage score that is computed through a sampling of the multiple frames of the image of the scene.

Although the present disclosure describes systems and techniques directed to optical image stabilization movement to create a super-resolution image of a scene, it is to be understood that the subject of the appended claims is not necessarily limited to the specific features or methods described. Rather, the specific features and methods are disclosed as example ways in which use of optical image stabilization movement to create a super-resolution image of a scene can be implemented.

Further to the descriptions above, a user may be provided with controls allowing the user to make an election as to both if and when systems, programs or features described herein may enable collection of user information (e.g., images captured by a user, super-resolution images computed by a system, information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the following, several examples are described:

Example 1: A method to create a super-resolution image of a scene, the method performed by a user device and comprising: introducing, through an optical image stabilization system, movement to one or more components of a camera system of the user device; capturing respective and multiple frames of the image of the scene, the respective and multiple frames of the image of the scene having respective, sub-pixel offsets of the image of the scene across the multiple frames as a result of the introduced movement to the one or more components of the camera system; performing, based on the respective, sub-pixel offsets of the image of the scene across the multiple frames, super-resolution computations; and creating, based on the super-resolution computations, the super-resolution image of the scene.

Example 2. The method as recited by example 1, wherein introducing the movement to the one or more components of the camera system is in response to entering a viewfinder mode.

Example 3: The method as recited by example 1, wherein introducing the movement to the one or more components of the camera system is in response to receiving a capture command.

Example 4: The method as recited by any of examples 1-3, wherein introducing the movement to the one or more components of the camera system of the user device includes introducing an in-plane movement to the one or more components of the camera system, wherein the in-plane movement is a movement contained in a plane defined by two axes.

Example 5: The method as recited by any of examples 1-4, wherein introducing the movement to the one or more components of the camera system of the user device includes introducing an out-of-plane movement to the one or more components of the camera system, wherein the out-of-plane movement is a movement outside a plane defined by two axes.

Example 6: The method as recited by any of examples 1-5, wherein performing the super-resolution computations includes: computing Gaussian radial basis function kernels; and computing a robustness model.

Example 7: The method as recited by any of examples 1-6, wherein performing the super-resolution computations includes analyzing the influence of motion blur across the multiple frames.

Example 8: The method as recited by any of examples 1-7, wherein performing the super-resolution uses a frame-recurrent approach that uses, from the multiple frames, a previous low-resolution frame and a current low-resolution frame to create a current super-resolution image.

Example 9: The method as recited by any of examples 1-8, wherein additional or supplemental movement is introduced to the one or more components of the camera system based on a coverage score that is computed through a sampling of the multiple frames of the image of the scene.

Example 10: A user device comprising: a camera system; an optical image stabilization system; one or more processors; a display; and a computer-readable storage media storing instructions of an optical image stabilization system drive manager application and a super-resolution manager application that, when executed by the one or more processors, perform complementary functions that direct the user device to: receive, by the one or more processors, a command that directs the user device to: capture an image of a scene; introduce, based on the received command and through the optical image stabilization system, movement to one or more components of the camera system during the capture of the image of the scene, wherein the introduced movement results in the capture of respective and multiple frames of the image of the scene that have respective, sub-pixel offsets of the image across the multiple frames; perform, by the one or more processors and based on the respective, sub-pixel offsets of the image of the scene across the multiple frames, super-resolution computations; create, by the one or more processors based on the super-resolution computations, a super-resolution image of the scene; and render, by the display, the super-resolution image of the scene.

Example 11: The user device as recited by example 10, wherein the user device further comprises one or more motion sensors that detect a static motion condition.

Example 12. The user device as recited by example 11, wherein the detection of the static motion condition causes the user device to introduce, through the optical image stabilization system and to one or more components of the camera system, an unsynchronized movement.

Example 13: The user device as recited by example 10, wherein the user device further comprises one or more motion sensors that detect a dynamic motion condition.

Example 14. The user device as recited by example 13, wherein the detection of the dynamic motion condition causes the user device to introduce, through the optical image stabilization system and to one or more components of the camera system, a synchronized movement.

Example 15: A system providing a means for performing the method as recited by any of examples 1-9.

Example 16: A user device configured to perform the method as recited by any of examples 1-9.

Example 17: A computer-readable storage medium including instructions that, when executed, configure a processor to perform the method as recited by any of examples 1-9.

What is claimed is:

1. A method to create a super-resolution image of a scene, the method performed by a user device and comprising:
   detecting a motion condition, the motion condition comprising a static motion condition or a dynamic motion condition;
   introducing, based on the detected motion condition, movement to one or more components of a camera system of the user device through an optical image stabilization system, the introduced movement being unsynchronized optical image stabilization movement responsive to the motion condition being the static motion condition or synchronized optical image stabilization movement responsive to the motion condition being the dynamic motion condition;
   capturing, based on the introduced movement, respective and multiple frames of an image of the scene, the respective and multiple frames of the image of the scene having respective, sub-pixel offsets of the image of the scene across the multiple frames as a result of the introduced movement to the one or more components of the camera system;
   performing, based on the respective, sub-pixel offsets of the image of the scene across the multiple frames, super-resolution computations; and
   creating, based on the super-resolution computations, the super-resolution image of the scene.

2. The method as recited by claim 1, wherein introducing the movement to the one or more components of the camera system is in response to entering a viewfinder mode.

3. The method as recited by claim 1, wherein introducing the movement to the one or more components of the camera system is in response to receiving a capture command.

4. The method as recited by claim 1, wherein introducing the movement to the one or more components of the camera system of the user device includes introducing an in-plane movement to the one or more components of the camera system, wherein the in-plane movement is a movement contained in a plane defined by two axes.

5. The method as recited by claim 1, wherein introducing the movement to the one or more components of the camera system of the user device includes introducing an out-of-plane movement to the one or more components of the camera system, wherein the out-of-plane movement is a movement outside a plane defined by two axes.

6. The method as recited by claim 1, wherein performing the super-resolution computations includes:
   computing Gaussian radial basis function kernels; and
   computing a robustness model.

7. The method as recited by claim 6, wherein performing the super-resolution computations includes analyzing an influence of motion blur across the multiple frames.

8. The method as recited by claim 7, wherein performing the super-resolution computations uses a frame-recurrent approach that uses, from the multiple frames, a previous low-resolution frame and a current low-resolution frame to create a current super-resolution image.

9. The method as recited by claim 8, wherein additional or supplemental movement is introduced to the one or more components of the camera system based on a coverage score that is computed through a sampling of the multiple frames of the image of the scene.

10. A user device comprising:
    a camera system;
    an optical image stabilization system;
    one or more processors;
    a display; and
    a computer-readable storage media storing instructions of an optical image stabilization system drive manager application and a super-resolution manager application that, when executed by the one or more processors, perform complementary functions that direct the user device to:
       detect a motion condition, the motion condition comprising a static motion condition or a dynamic motion condition;
       introduce, based on the detected motion condition, movement to one or more components of the camera system through the optical image stabilization system, the introduced movement being unsynchronized optical image stabilization movement responsive to the motion condition being the static motion condition or synchronized optical image stabilization movement responsive to the motion condition being the dynamic motion condition;

capture, based on the introduced movement, respective and multiple frames of an image of the scene, the respective and multiple frames of the image of the scene having respective, sub-pixel offsets of the image of the scene across the multiple frames as a result of the introduced movement to the one or more components of the camera system;

perform, by the one or more processors and based on the respective, sub-pixel offsets of the image of the scene across the multiple frames, super-resolution computations;

create, by the one or more processors based on the super-resolution computations, a super-resolution image of the scene; and render, by the display, the super-resolution image of the scene.

11. The user device as recited by claim 10, wherein the user device further comprises one or more motion sensors that detect the static motion condition or the dynamic motion condition.

12. The user device as recited by claim 10, wherein the detection of the static motion condition causes the user device to introduce, through the optical image stabilization system and to one or more components of the camera system, an unsynchronized optical image stabilization movement.

13. The user device as recited by claim 10, wherein the detection of the dynamic motion condition causing the user device to introduce, through the optical image stabilization system and to one or more components of the camera system, the synchronized movement is effective to superimpose the synchronized optical image stabilization movement on a first movement, the superimposing being constructive or destructive.

14. The method as recited by claim 10, wherein the introduction of the movement to the one or more components of the camera system is in response to receiving a capture command.

15. A computer-readable storage media storing instructions that, when executed by one or more processors, perform complementary functions that direct a user device to:

detect a motion condition, the motion condition comprising a static motion condition or a dynamic motion condition;

introduce, based on the detected motion condition, movement to one or more components of a camera system of the user device through an optical image stabilization system, the introduced movement being unsynchronized optical image stabilization movement responsive to the motion condition being the static motion condition or synchronized optical stabilization movement responsive to the motion condition being the dynamic motion condition;

capture, based on the introduced movement, respective and multiple frames of an image of a scene, the respective and multiple frames of the image of the scene having respective, sub-pixel offsets across the multiple frames as a result of the introduced movement to the one or more components of the camera system;

perform, based on the respective, sub-pixel offsets of the image, super-resolution computations; and create, based on the super-resolution computations, a super-resolution image of the scene.

16. The computer-readable storage media as recited by claim 15, wherein the super-resolution computations include:

Gaussian radial basis function kernel computations; and robustness model computations that analyze an influence of motion blur across the multiple frames.

17. The computer-readable storage media as recited by claim 16, wherein the super-resolution computations include computations to analyze the influence of motion blur across the multiple frames.

18. The computer-readable storage media as recited by claim 17, wherein the instructions include instructions that direct the user device to use, from the multiple frames, a previous low-resolution frame and a current low-resolution frame to create a current super-resolution image.

19. The computer-readable storage media as recited by claim 15, wherein the instructions to introduce additional or supplemental movements to the one or more components of a camera system are based on a coverage score of the multiple frames of the image of the scene.

20. The computer-readable storage media as recited by claim 19, wherein the instructions include instruction to compute the coverage score based on a sampling of the multiple frames of the image of the scene.

* * * * *